United States Patent
Höfler et al.

[11] Patent Number: 5,840,358
[45] Date of Patent: Nov. 24, 1998

[54] PROCESS FOR THE PREPARATION OF AN ANIMAL FEED SUPPLEMENT BASED ON FERMENTATION BROTH

[75] Inventors: Andreas Höfler, Alzenau; Hans-Christian Alt, Gelnhausen; Claas-Jürgen Klasen, Freigericht; Heinz Friedrich, Hanau; Ulrich Hertz, Bruchkobel; Lothar Mörl, Hohenwarthe; Rüdiger Schütte, Alzenau, all of Germany

[73] Assignee: Degussa Aktiengesellschaft, Frankfurt, Germany

[21] Appl. No.: 866,161

[22] Filed: May 30, 1997

[30] Foreign Application Priority Data

May 31, 1996 [DE] Germany .................. 196 21 930.2

[51] Int. Cl.⁶ ....................................................... A23K 1/00
[52] U.S. Cl. ............................ 426/467; 426/61; 426/468; 426/656
[58] Field of Search ..................... 426/467, 468, 426/520, 656, 61; 34/443, 586, 587

[56] References Cited

U.S. PATENT DOCUMENTS

4,582,713  4/1986  Hirokawa et al. .................. 426/467
4,777,051 10/1988  Nagano et al. ....................... 426/61

Primary Examiner—George Yeung
Attorney, Agent, or Firm—Pillsbury Madison & Sutro LLP

[57] ABSTRACT

A process for the preparation of an animal feed supplement based on fermentation broth is disclosed, wherein the supplement contains wholly or predominantly a fermentation product and the other constituents of the fermentation broth, which is characterised in that the fermentation broth is granulated, compacted and dried in a fluidised bed in one step whilst a sufficient amount of energy to obtain a desired particle diameter and a desired bulk density is introduced into the fluidised bed by mechanical device in addition to the energy required to produce the fluidised bed. As a result of this, it is possible, inter alia, to prepare continuously, in a single process step, granules conforming to specification of additives such as lysine, threonine or tryptophan using, in particular, raw fermentation broths as starting substance.

35 Claims, 2 Drawing Sheets

FIG. 1

PROCESS FOR THE PREPARATION OF AN ANIMAL FEED SUPPLEMENT BASED ON FERMENTATION BROTH

FIELD OF THE INVENTION

The invention relates to a process for the preparation of an animal feed supplement based on fermentation broth, wherein the supplement contains wholly or predominantly a fermentation product and the other constituents of the fermentation broth.

PRIOR ART

Animal feeds are supplemented with individual amino acids according to the animals' requirement. For supplementing animal feeds, e.g. with L-lysine, L-lysine monohydrochloride with an L-lysine content of 78% has been used predominantly hitherto. As the L-lysine is prepared by fermentation, it has to be separated first from all the other constituents of the raw fermentation broth in elaborate process stages for the preparation of the monohydrochloride, then converted to the monohydrochloride and the latter has to be crystallised. In so doing, a large number of by-products and the reagents required for work-up are produced as waste. As a high degree of purity of the animal feed supplement is not always necessary and, moreover, valuable substances with a nutritive effect are often contained in the by-products of fermentation, there has therefore been no lack of attempts in the past to avoid the elaborate preparation of feed amino acids, particularly of pure L-lysine monohydrochloride, and to convert the raw fermentation broth more cheaply into a solid animal feed. None of these attempts have led, however, to an economically acceptable result.

The complex composition of such media has proved to be a serious disadvantage since these are generally difficult to dry and are then hygroscopic, practically non-free-flowing, liable to caking, and unsuitable for technically demanding processing in mixed feed plants. Above all, fermentation products of lysine are particularly disadvantaged in this respect. The simple removal of water from the raw fermentation broth by spray drying led to a dusty, highly hygroscopic concentrate that became lumpy after a short storage period, which cannot be used in this form as an animal feed.

In order to obtain a free-flowing product which is stable in storage, a large quantity of additives of the most varied kind had to be mixed in with the concentrate. As a result, however, the amino acid content, already relatively small in many cases, was reduced even further. Such a product is described e.g. in DE-OS 23 57 119, according to which a concentrate is prepared from the fermentation broth, optionally after removal of the biomass, and auxiliaries are then added thereto. Alternatively, the lysine may be liberated from the concentrate by precipitation with methanol. DD 139 205, Upr. Mirkoben.Sint., 111–118 (1973), CA 105 (19): 170542g, DE 30 32 618, U.S. Pat. No. 4,327,118 and CS 250 851 also describe such feed supplements prepared by fermentation to which additives have been added.

A process is known from EP 0 122 163 and U.S. Pat. No. 5,133,976 according to which a raw fermentation broth may be obtained whilst maintaining very special fermentation conditions, which broth can be dried to form a solid and stable product. Here, too, however, the L-lysine content is only 35–48 wt. %. It is also known from these disclosures that the removal of water by azeotropic distillation with paraffin oil leads to acceptable products. This process too, however, is elaborate and cost-intensive. Toxicologically harmful tetrachloromethane was also used in a similar manner for this purpose (CS 164 706).

The use of a spray drier with an integrated fluidised bed provides a finely divided and porous but free-flowing spray-dried granulated product which has a very low bulk density and is still very hygroscopic. A considerable amount of dust is produced when this product is handled.

Layer-granulation in the fluidised bed also proved to be relatively unsuitable since large quantities of additives (usually more than 100 wt. %) are also required in this case, these being added continuously in DD 268 856. The use thereof is particularly vital for binding the water from the fermentation broth so as to prevent the granules caking, which would be particularly disadvantageous for layer-granulation.

Other processes for the preparation of animal feed supplements based on fermentation broth are known from U.S. Pat. No. 4,777,051, EP 0 533 039 and EP 0 615 693.

U.S. Pat. No. 4,777,051 discloses a spray drying process followed by an additional drying stage. Tryptophan or threonine solutions containing 5–95 wt. %, based on the total solids content, are sprayed in a first stage to obtain a semi-dry granular product with a residual moisture content of about 10%. The moist granular product is then spread out on a conveyor belt drier with a perforated bottom and dried fully with hot air, a product with a residual moisture content of about 4 wt. % being obtained.

Drying is consequently carried out in two steps in two different pieces of apparatus, which is expensive on the whole.

EP 0 533 039 also deals with processes for the preparation of an amino acid animal feed supplement based on fermentation broth, wherein the supplement may be obtained from the fermentation broth directly by spray drying. To this end, in one variant, part of the biomass is separated before spray drying. As a result of a very pure fermentation, i.e. if a fermentation broth with a low residual organic substance content is obtained, the broth may even be dried without the biomass and without additional carrier auxiliary to obtain a granular product that is easy to handle.

A disadvantage of the process of EP 0 533 039 is firstly the biomass separating stage and secondly the fact that the spray drying process is greatly dependent on the prior fermentation procedure. That means the range of broths actually to be processed is comparatively limited. A further disadvantage is that a relatively hygroscopic product with a relatively low bulk density of <530 kg/m3 is obtained.

EP 0 615 693 again solves this problem by means of a two-stage drying process.

Said text discloses a process for the preparation of an animal feed supplement based on fermentation broth wherein the fermentation broth, optionally after a part of the constituents has been removed, is spray-dried to obtain fine granules, at least 70 wt. % of which have a maximum particle size of 100 μm, and in that said fine granules are increased in size in a second step to form a granular product which contains at least 30 wt. % of fine granules.

Apart from the two-stage nature of the drying-granulation process, a particular disadvantage of this process is that mechanical granulation by the high-shear mixing equipment with which the fine granules are preferably increased in size to obtain the granular product may take place only batchwise, i.e. not continuously. This is because it has become apparent in practice that the granulation process in the Eirich intensive mixer used in preference leads to solid caking. As a result, there are frequent interruptions (several times a day) in the granulation stage, during which the Eirich mixers are cleaned by hand. As a result of the batchwise operation, unwanted product variations naturally occur. The two-stage drying-granulation process means high investment, maintenance and energy costs, and is thus expensive. At the same time, the two-stage process is labour-intensive and hence disadvantageous.

SUMMARY OF THE INVENTION

In view of the prior art stated and discussed herein, the object of the invention was thus to develop a process of the kind mentioned at the beginning in such a way that it may be operated continuously and in the steady state, wherein the process should permit, if possible in a simple and inexpensive manner, the preparation of a product which is as nonhygroscopic or non-sticky as possible. At the same time, drying and granulation should take place in one stage, if possible, even with relatively "impure" fermentation broths. Moreover, the process of the invention should permit the standardisation of the properties of the animal feed supplement in a simple manner.

Due to the fact that the fermentation broth is granulated, compacted and dried in a fluidised bed in one stage, whilst a sufficient amount of energy to obtain a desired particle diameter and a desired bulk density is introduced into the fluidised bed by mechanical means in addition to the energy required to produce the fluidised bed, it is possible, inter alia, to prepare continuously, in a single process stage, animal feed supplements as granular products complying with the specifications using, in particular, fermentation broth concentrates of the kind obtained during the processing of fermentation broths as starting product. That is, no additives are required to obtain a product complying with the specifications. The addition thereof is not excluded, however. Other conventional additives such as, e.g. perlite, may thus be used as long as the features according to the invention remain unaffected. In preference, such additional additives are limited to less than 10 wt. % in the end product, in particular, their content is max. 5 wt. %. According to the invention, such additives may also be used in a quantity of less than 1%. It is particularly, advantageous, however, and also desirable within the context of the invention, to omit additives altogether.

A feature of particular note when using the process according to the invention is that fluidised bed granulation-drying can be carried out continuously. Highly surprisingly, it is thereby possible to avoid the two-stage nature of the drying-granulation process according to the prior art, which in particular renders superfluous the manual cleaning of the Eirich intensive mixer normally used for the second stage of the two-stage process (granulation stage).

Moreover, it is also possible to obtain products with high bulk densities in a particularly advantageous manner by the process according to the invention, wherein the particle discharge may take place continuously in a classifying discharge and the particle size distribution remains constant in steady-state operation.

The particles produced also have excellent strength and, due to their essentially round form, outstanding pour and flow properties.

The products that can be obtained according to the process of the invention have an extremely low moisture content and are not hygroscopic.

Due to the use of a device of the kind described further below, continuous operation is possible, whereby no caking is ascertained either on the walls or on other items of equipment such as nozzle, sieve plate or mechanical compacting device of a fluidised bed drying-granulation plant.

The fluidised bed granulation-drying to be used in preference for carrying out the process of the invention is a method for solidifying liquids. A fluidised bed is produced, which means that the solids particles are kept in suspension in a current of air or inert gas directed upwards. In this state, the solids particles are separated from one another and are thus accessible all round to the spray droplets when further liquid is sprayed into the bed. Moreover, the heat and material exchange between the solids particles and the gas stream is intensive in this state. The fluidised bed or the bed of particles which must be present at the beginning of fluidised bed granulation-drying comprises advantageously a charge of a prior run. It is equally possible, however, to use a substance that differs from the fermentation broth concentrate to be sprayed as the fluidised bed. If a suspended particle of the fluidised bed is impacted by a spray droplet of the fermentation broth concentrate, the liquid product of the spray droplet is dispersed on the solid substrate by spreading. In view of the intensive heat and material exchange with the surrounding gas stream, solidification of the liquid film takes place rapidly by drying if the starting product is a solution or suspension, or by cooling if the sprayed product is melted. The particle grows as a result of multiple spraying, spreading and solidification. It is compact and also virtually round.

It is obvious that a certain energy input is required to produce the fluidised bed. This usually takes place, as mentioned already above, by means of a stream of air or inert gas directed upwards which keeps the fluidised bed in suspension. It is important within the context of the invention that, in addition to the energy required to produce the fluidised bed, further energy is introduced into the fluidised bed by mechanical means. A process counteracting granule growth is evidently brought about by this input. In the stationary fluidised bed, i.e. when a constant fluidised bed of dried and granulated starting material is operated continuously, whereby the feed broth is sprayed in continuously and a stream of granular product is discharged continuously, a fine injection leads to a onion-like compact granule growth on the granules in the fluidised bed. Due to the additional input of mechanical energy into the fluidised bed, a less intensive granule growth or a levelling of the particle diameters is achieved. These processes counteracting the normal growth process are desirable processes which are not based on particle destruction or defective growth of particles. It was particularly surprising in this case that, contrary to destruction by attrition, which can occur in all size classes of particles, no additional dust is produced which can form a new nucleus due to agglomeration. Moreover, the input of additional mechanical energy does not have the same effect as particle breakage occurring under conventional conditions, which may occur for example during the collision of particles and/or as a result of temperature shock when the particles are sprayed. Although both attrition and particle breakage may occur when additional mechanical energy is introduced, the effect does not seem to be disadvantageous in the case according to the invention, which was even less foreseeable.

In a preferred process modification according to the invention, it is observed that the additional mechanical energy brings about an increase in the bulk density and a reduction in the mean particle diameter, compared with a fluidised bed granulation-drying in which no additional mechanical energy is introduced. As explained already above, it must be assumed that both attrition and particle breakage take place, but it is particularly preferable that the additional mechanical energy introduced acts on the growing granule in the manner of a surface treatment and compacting. Within the context of the invention, the term surface treatment means essentially the change in particle size by attrition.

The process for the preparation of an animal feed supplement based on fermentation broth is carried out particularly advantageously in such a way that the additional energy is introduced into the fluidised bed by means of movable, uniplanar structures. These may be rotating knives, blades, blade surfaces, flat bars or compacting devices which are used in the chamber of the fluidised bed. It is possible to drive he knives, blades, flat bars, compacting devices or the like by mechanical means and thus obtain a constant comminution of the granulate particles, so that the particles of the fluidised bed remain below a certain particle size. All the other tools known to the expert are, however, also possible and may for example be immersed directly in the fluidised bed. The use of rotating screws or high-shear mixers is thus conceivable, whereby these tools may also act on the particles or granules in the fluidised bed and interact with the particles.

The particularly advantageous result of the procedure according to the invention is a compacted product which remains below a certain particle size due to the constant comminution and attrition of the granulate particles. The upper particle size limit in this case is a function of the energy input, based on the solids throughput, by means of, for example, the compacting device, the rotating knives or the rotating screw. The process of the invention is preferably operated in such a way that the mean particle size of the animal feed supplement is adjusted to values between 0.1 and 1.5 mm, in preference 95% of the particles being between 0.1 and 1.5 mm in size. Moreover, it is particularly advantageous if the size of the particles of the animal feed supplement is adjusted such that 95% of the particles are between 0.3 and 1. 3 mm in size. In a further advantageous variant of the process according to the invention, it is preferable if 95% of the particles are between 0.5 and 1.2 mm in size.

As mentioned already, the result of the process according to the invention in one stage in a single piece of equipment using a fermentation broth which may be thickened, partially or wholly freed from biomass or in the original state, is a product with an excellent bulk density. The bulk density of the animal feed supplement is preferably adjusted to >600 kg/m3. In a further advantageous process modification, the invention may be carried out in such a way that the bulk density of the animal feed supplement is adjusted in a single stage to >700 kg/m3.

In addition, animal feed supplements with outstanding attrition resistance of the granular product can be obtained by the process according to the invention. It is readily possible, by conducting the process in a suitable manner, to adjust the attrition resistance of the animal feed supplement to attrition values in the region of <1.0 wt. %. In particular preference, the process of the invention is carried out in such a way that the attrition resistance of the animal feed supplement is adjusted to an attrition of between 0 and 0.3 wt. %.

Such advantageous granules of animal feed supplements based on fermentation broth are obtained preferably with an additional mechanical energy input per ton of granular product in the region of 8 to 20 kWh/t. The additional input of mechanical energy, determined as the specific energy input per tonne of granular product, is particularly preferably between 12 and 16 kWh/t.

As mentioned already, the animal feed supplements that can be obtained according to the process of the invention may be obtained by spraying fermentation broths in fluidised bed granulation-drying plants wherein the fermentation broth which is to be sprayed may be thickened, partially or wholly freed from biomass or in the original state, i.e. untreated. The fermentation broth or the concentrate likewise to the sprayed according to the invention are obtained by known processes. The fermentation broths suitable as a basis for the animal feed supplement according to the invention are in particular those which contain a medicinal product or an amino acid as fermentation product, wherein a particularly preferred medicinal product is chlorotetracycline and the particularly preferred amino acids are lysine, threonine or tryptophan. The layered granular products according to the invention can be prepared particularly well with these products. L-lysine is quite particularly preferred.

The animal feed supplements based on fermentation broth which can be obtained according to the invention have, for example, the following composition of dry mass, in the case of an amino acid supplement:

| | |
|---|---|
| Free supplement amino acid | 40–90 wt. % |
| Proteins | max. 0.5–20 wt. % |
| Carboxylic acid with less than | |
| 8 C atoms | max. 13 wt. % |
| Total sugar | max. 10 wt. % |
| Fats and oils | max. 6 wt. % |
| Minerals | max. 3–30 wt. % |

This product contains advantageously all the constituents of the fermentation broth.

In preference, animal feed supplements are obtained according to the invention in which the components lie within the following stated ranges:

| | |
|---|---|
| Proteins | 10–16 wt. % |
| Carboxylic acid with less than | |
| 8 C atoms | max. 8 wt. % |
| Total sugar | 2–10 wt. % |
| Minerals | 5–25 wt. % |

The products which can be obtained according to the invention usually have a residual water content of about 0.1 wt. %. In order to avoid caking, the water content should not exceed 5 wt. %, max. 10 wt. %, however.

The protein content is determined from the total nitrogen content minus inorganic nitrogen content minus nitrogen content of the free amino acids and multiplication of the value obtained by 6.25 ((total N %–inorg. N % –ASN %)×6.25). The total nitrogen content is determined by Kjeldahl digestion (standard method), the inorganic nitrogen content (ammonium minus content) is determined e.g. by colorimetry, titrimetry or potentiometry, the nitrogen content of the free amino acid is determined by the quantitative determination of the free amino acids (amino acid analyser (ASA)) followed by calculation of the N content. The totality of all the inorganic cations and anions are referred to as minerals.

The protein content of the granular products that can be obtained according to the invention is usually between 0.5 and 20 wt. %, the proteins also being used according to the invention to increase the stability of the granular product. For this reason, a lower region of 0.5 wt. % is desirable, and a particularly favourable granular product is obtained with higher protein contents between 8 and 18 wt. % and in particular with contents above 10 wt. %.

The supplements that can be obtained according to the invention usually contain up to 20 wt. % of fermentation biomass.

Higher amino acid contents up to max. 90 wt. % in the dry mass may be achieved, for example, during the preparation of L-threonine with Escherichia coli BK IIM B-3996 (FR-A 2 640 640), in this case in particular because of the relatively simple media.

In the preparation of lysine or tryptophan with corynebacterium glutamicum or *Escherichia coli* K12 derivatives, the amino acid content is usually somewhat lower; in the case of tryptophan in particular, maximum contents of 70 wt. % are typical at present by fermentation.

The supplement that can be obtained according to the invention contains preferably predominantly only one component, particularly an amino acid, as active substance. Such a supplement can then be metered universally into any feed or premixes according to its active substance content. In defined feed mixtures, however, it may also be advantageous that several components, particularly amino acids, are present in the supplement in a particular ratio to one another, so that the desired enrichment is achieved with only one supplement. The ratio of said active substances may be obtained, for example, by mixing several fermentation broths or supplements and also by metering advantageously relatively small quantities of pure active substances, e.g. amino acids. In addition to an individual active substance or several defined active substances or substances contained in controlled quantities in the supplement, as few as possible other undefined active substances or active substances not suitable as a supplement should be present in the supplement.

The fermentation broths used usually have a solids content of 7.5 to 26 wt. % and, in the case of amino acids as the active substance, contain these in a quantity of 1 to 20 wt. %. In the case of amino acids, fermentation processes in which the amino acid is present in a quantity of at least 40 wt. % in the dry mass after fermentation has ended are particularly advantageous. It is also advantageous if fermentation is carried out with a limited amount of sugar at least at the end, but advantageously over at least 30% of the fermentation period, i.e. the concentration of usable sugar in the fermentation medium is kept at or reduced to max. 0.3 wt. %.

The fermentation broths for amino acid supplements are prepared preferably in such a way that a microorganism producing at least one amino acid is cultivated in a fermentation medium which contains at least one carbon source, at least one nitrogen source, mineral salts and trace elements, fermentation being carried out in such a way that at the end thereof a raw fermentation broth with a usable sugar content of max. 4 g/l and in particular with a solids content of 7.5 to 26 wt. %, an amino acid content of 1 to 20 wt. %, advantageously 4 to 10.5 wt. % and a sugar content of max. 2.6 wt. % is obtained.

Using suitable microorganisms, fermentation is cultivated advantageously in such a way that the dry mass of the fermentation broth contains max. 15 wt. % of protein, and in particular at least 40 wt. % of amino acids, max. 8 wt. % of carboxylic acid with less than 8 carbon atoms, max. 10 wt. % of total sugar, max. 5 wt. % of fats and oil and max. 5 to 30 wt. % of minerals. Towards the end of fermentation, the usable sugar content is adjusted to max. 1 g/l, i.e. no sugar is added and fermentation is discontinued only when the sugar content reaches or fall below this value.

In order to increase the amino acid content in the dry mass or to standardise the dry mass to a certain amino acid content or to lower the protein content of the dry mass, the biomass and optionally other substances may be removed by mechanical separation methods and whilst leaving the predominant proportions of residual components of the fermentation broth, preferably after fermentation has ended.

If no biomass is to be separated, fermentation should be carried out advantageously in such a way that as little biomass as possible is produced, wherein the extra substances added should be consumed as far as possible at the end. Such a fermentation is described e.g. in DE-A 41 30 867, Example 3. Advantageously, fermentation is carried out in such a way that over at least 30%, preferably over 70% of the fermentation period, the concentration of usable sugar in the fermentation broth is at most 0.3 wt. %.

The amino acid-producing microorganisms used were preferably suitable mutants of the corynebacterium or brevibacterium species for lysine, e.g. the strain deposited at and obtainable from the German Collection for Microorganisms under DSM 5715.

The carbon source used is preferably starch hydrolysates (glucose) or saccharose. A small proportion may also stem from sugar beet or sugar cane molasses.

This proportion should not exceed 5 wt. % of the total carbon source (=10 wt. % of molasses in the total carbon source).

For threonine and tryptophan, suitable mutants of the *Escherichia coli* species are used in preference for threonine, or the strain BK IIM B-3996 (FR-A 2 640 640).

The nitrogen sources, apart from ammonia or ammonium sulphate, are substances containing hydrolysates of protein such as maize gluten, soya meal or the biomass of a previous batch or, for example, maize swelling water or fish peptone.

The fermentation temperature is advantageously between 30 and 40° C., the pH of the fermentation medium is between 6.0 and 8.0. The fermentation period is generally max. 100 h.

After fermentation has ended, the microorganisms may be killed by heat or by other methods, e.g. by the addition of a mineral acid such as sulphuric acid.

Optionally, the biomass (partially) may then be separated by known methods, such as separation, decanting, a combination of separation and decanting, ultrafiltration or microfiltration.

The fermentation broth is then thickened by known methods e.g. in a thin film or falling film evaporator to a preconcentrate with a solids content of 30 to 60 wt. %. Said preconcentrate may then, like the fermentation broth, be subjected directly to the fluidised bed granulation-drying process according to the invention.

In so far as standardisation of the animal feed according to the invention is desired in terms of the amino acid content, this may be carried out, for example, by an appropriate choice of the quantity of residual biomass and/or suitable mixing of preconcentrates and/or fermentation broths. Accordingly, biomass-free or biomass-reduced broths may also be mixed with original broths for standardisation. Another possibility is the addition of small quantities of additives that comply with the feed laws, such as wheat bran, maize meal or perlite.

The animal feed supplements that can be obtained according to the process of the invention, i.e. process products, are used for supplementing or preparing an animal feed or premix for animal feeds.

A device is described below which is adapted specially for the process according to the invention. It is a device for the preparation of an animal feed supplement based on fermentation broth, having a fluidised bed granulation-dryer with a drying chamber through which hot air flows upwards, a gas distributor being arranged in the drying chamber above which plate dry product is in the fluidised state in a fluidised bed during operation, wherein the device is characterised in that at least one separately adjustable piece of equipment is arranged in the fluidised bed zone for introducing additional mechanical energy into the fluidised bed.

The adjustable piece of equipment, in a preferred embodiment, refers to mechanically or electrically operated compacting devices which are fitted with rotating surfaces, blades or knives. The adjustable piece of equipment must be arranged in such a way that it can interact with the surfaces of the particles forming the fluidised bed. It is sufficient that, during operation of the fluidised bed (with an incoming air stream) contact of the particles with the adjustable piece of apparatus is possible. It is preferable, however, if the rotating surfaces, blades or knives of the adjustable piece of equipment are immersed completely in the fluidised bed. In this state, a particularly favourable specific energy input by the adjustable piece of equipment is obtained.

BRIEF DESCRIPTION OF THE DRAWINGS

The invention is discussed in more detail below with reference to the accompanying drawings wherein.

Figure 1:
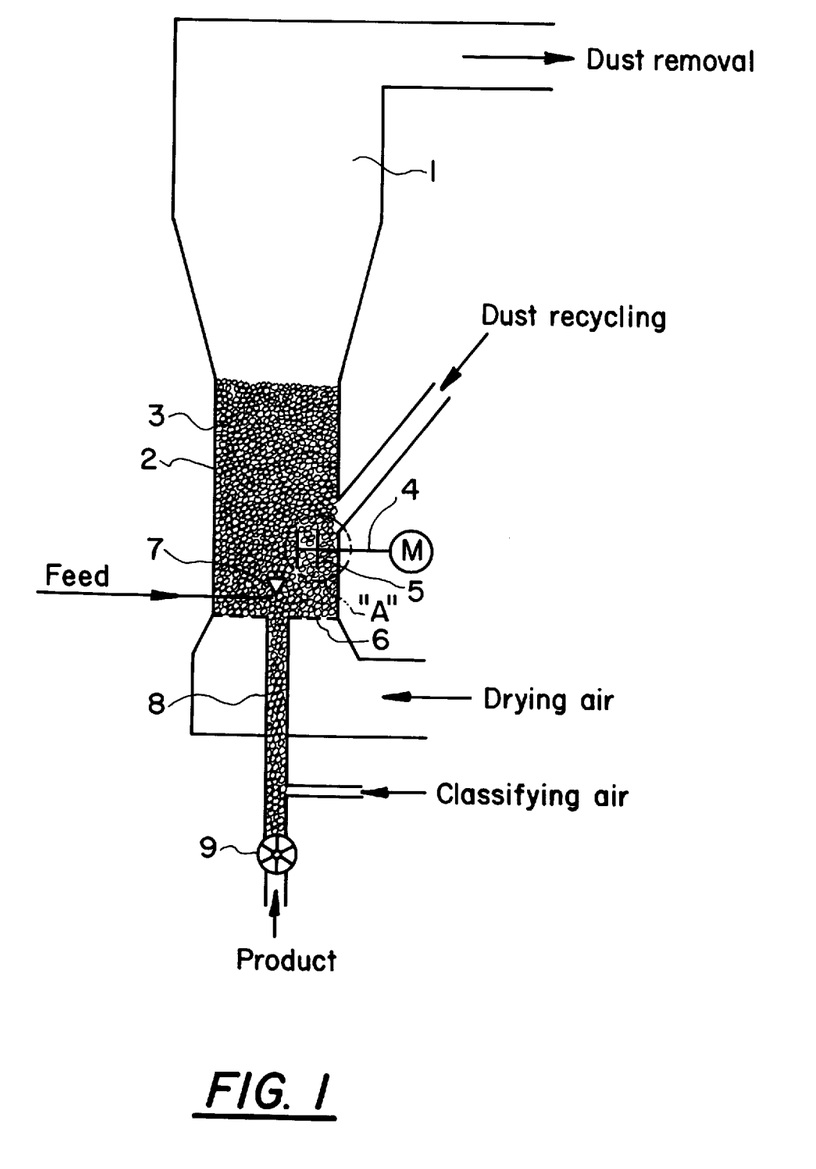
FIG. 1 is a schematic diagram of a fluidised bed drying-granulation plant.

In FIG. 1, the reference 1 refers to the fluidised bed granulation-drying device. This has a fluidised bed chamber 2, which is suitable for receiving the particles 3 of the fluidised bed 3. In the example shown, the fluidised bed chamber 2 is a cylindrical drying chamber through which hot air flows upwards through sieve plate 6. Above the round gas distributor plate 6 the dry product 3 is in the fluidised state in the fluidised bed zone which is shown in the present example by the particles. The numeral 7 refers to a two-component nozzle which is incorporated laterally in the wall of the drier. From here, the starting substances (fermentation broth) are atomised directly into the fluidised bed. An adjustable compacting unit 4 driven by motor M has pieces of equipment shown in detail in FIG. 2 and 3. The blade head 5 is identifiable in FIG. 1, which is immersed completely in the fluidised bed 3. A classifying pipe 8 is connected beneath the sieve plate 6 to the fluidised bed chamber 2 and has the function of feeding classifying air and expelling product through the discharge sluice 9. Finally, a dust discharge unit is also provided for in the fluidised bed granulation-drying apparatus 1, so that fine dust produced is discharged from the drier 1 together with the air, separated in an external cyclone and can be recycled to the fluidised bed via the dust recycle.

Figure 2:
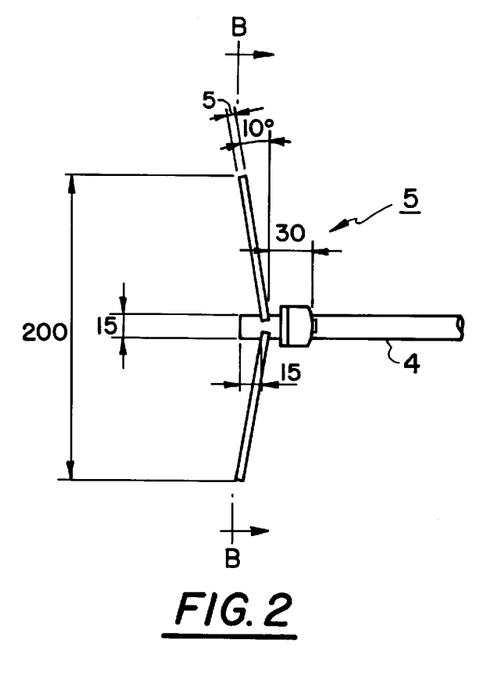
FIG. 2 is an enlarged elevational view of the detail "A" of FIG. 1.
Figure 3:
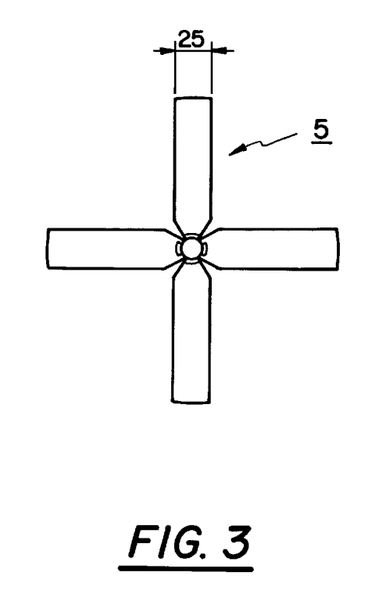
FIG. 3 is an end view taken along the line B—B of FIG. 2.

The detail A from FIG. 1, namely the blade head 5, can best be described with reference to FIG. 2. It is composed of four flat bars arranged in the shape of a cross with respect to one another and arranged on a rotatable shaft, the shaft being connected in an adjustable manner with the motor drive M.

The device shown is operated in the following manner. The thickened or raw, unthickened fermentation broth is sprayed into the fluidised bed by means of the two-component nozzle, air or another gas or gas mixture acting as the propellant. The fluidised bed is operated in the steady state, whereby the fluidised bed has to be filled with a suitable start-up material when the granulator is first started up. After this material has been fluidised with hot air and the insulated drying chamber has been heated, the desired fermentation broth or the concentrate prepared therefrom by thickening can be sprayed in. The fluidised bed is operated in the steady state, this being particularly the case if an approximately constant fluidised bed of dried and granulated starting material is operated continuously, the feed broth being sprayed in continuously and a stream of granular product being removed or drawn off continuously via the classifying pipe and the discharge sluice. The fine broth injection leads to a onion-like compact growth on the granules in the fluidised bed.

Constant compacting of the granules is obtained in the fluidised bed by means of the compacting device, with the result that the particles remain above a predetermined particle density. The upper granule limit is likewise a function of the energy input of the compacting device based on the solids throughput. A classifying process by means of a separate stream of classifying air from below into the bed ensures that only particles above the desired particle size of about 500 $\mu$m are discharged. The combination of compacting device and classifier therefore produces a very narrow particle size distribution and a high bulk density of the end product. The end product is cooled briefly in the air stream on discharge and can then be bagged directly after a check screen.

Preparation of the fermentation broth and the fermentation concentrate 16760 kg of sterile solution with the following composition are placed in a 50 m3 fermentation vessel with agitator and aeration system:

| | |
|---|---|
| Water | 15600 kg |
| Molasses | 100 kg |
| Saccharose | 220 kg |
| Corn steep liquor | 250 kg |
| Ammonium sulphate | 570 kg |
| Minerals and trace elements | 20 kg | and adjusted to a pH of 6.9 with an ammonia solution.

3200 kg of an inoculum of Corynebacterium glutamicum cultivated in a separate fermentation vessel are added to said solution.

Within 48 h, sterile solutions of saccharose and ammonium sulphate are metered in at 33° to 35° C.

Throughout the fermentation period, the pH is kept at between 6.5 and 7.0 by means of ammonia solution. The rate of aeration is adjusted to 0.5 to 0.7 vvm.

The total quantities of media used for this fermentation in the 50 m3 fermenter have the following average composition:

| | |
|---|---|
| Water | 20400 kg |
| Molasses | 400 kg |
| Saccharose | 8900 kg |
| Corn steep liquor | 290 kg |
| Ammonium sulphate | 1220 kg |
| Ammonia, 25% | 2220 kg |
| Minerals and trace elements | 65 kg |

At the end of the fermentation period, about 33.5 t of a raw fermentation broth with a solids content of about 6000 kg and an L-lysine base content of about 2900 kg to 3200 kg are obtained.

The fermentation broth is thickened in a falling film evaporator under reduced pressure to a solids content of about 50 wt. %.

Spray granulation of said concentrates is described in Examples 1 to 4.

For the process according to the invention, any other fermentation broth or the concentrate thereof may also, of course, be used. The fermentation broths which are described in European patent EP 0 533 039 and in European patent applications EP 0 532 867 and EP 0 615 693 may be mentioned by way of example.

EXAMPLE 1

The starting substance is a fermentation concentrate from current production according to the above standard recipe for the preparation of Biolys 60. The concentrate has a water content of about 53%, an L-lysine base content of about 24%, a sugar content of about 1%, a biomass content of about 10%, the remainder being composed of other fermentation by-products and minerals.

30 kg of Biolys 60 granules as starting fill were placed in a fluidised bed granulation-drying plant fitted with a distributor plate with a diameter of about 400 mm and a twin-blade compacting device with a diameter of 150 mm integrated in the fluidised bed. The compacting device was operated at a peripheral speed of 20 m/s. The fluidised bed was impinged with hot air at about 210° C. as drying and fluidising agent and about 60 kg/h of concentrate of lysine fermentation with the above composition were sprayed in continuously via a two-component nozzle. After about 4–5 hours, steady-state conditions were reached whereby a granular product with the following product parameters could be discharged continuously.

Product parameters of a Biolys granular product obtained under steady-state conditions:
Moisture content: about 3%
Bulk density: 690 kg/m3
Tapped density: 710 kg/m3
Particle size distribution: 10% <900 $\mu$m
   50% <1200 $\mu$m
   90% <1550 $\mu$m
Attrition*: 0.2%
Particle breakage resistance: 2.5–7N
*Erweka Friabilator, 50 g, 20 min, 20 rpm, 400 $\mu$m screen

EXAMPLE 2

The starting material of granulation is a fermentation concentrate from current production according to the above recipe for the preparation of Biolys 60. The concentrate has a water content of about 51%, an L-lysine base content of about 26%, a sugar content of about 1%, a biomass content of about 10%, the remainder being composed of other fermentation by-products and minerals.

40 kg of Biolys 60 granular product as starting fill were placed in a fluidised bed granulation-drying plant fitted with a distributor plate with a diameter of 400 mm and a compacting device with a 5.5 kW drive integrated in the fluidised bed. The four-blade compacting device was operated at a peripheral speed of 31 m/s. The power input of the compacting device into the fluidised bed was 490W. The fluidised bed was impinged with hot air at about 220° C. as drying and fluidising agent and the concentrate of lysine fermentation with the above composition was sprayed in continuously via a twocomponent nozzle. Under steady-state conditions, about 37 kg/h of granular product with the following product parameters were produced and discharged continuously.

Product parameters of the Biolys granular product obtained under steady-state conditions:
Moisture content: 1.0%
Bulk density: 737 kg/m3
Tapped density: 756 kg/m3
Particle size distribution:: 10% <390 $\mu$m
   50% <600 $\mu$m
   90% <980 $\mu$m
   95% <1120 $\mu$m
Attrition*: 0.04%
*Erweka Friabilator, 50 g, 20 min, 20 rpm, 45 $\mu$m screen

EXAMPLE 3

The starting material for granulation is a fermentation concentrate from the production of Biolys 60 according to the above recipe. The concentrate has a water content of about 54%, an L-lysine base content of about 24%, a sugar content of about 1%, a biomass content of about 10%, the remainder being composed of other fermentation by-products and minerals.

The fluidised bed granulation-drying plant with a 400 mm distributor plate and integrated four-blade compacting device operating at a peripheral speed of 31 m/s with a power input of 490W was impinged with hot air at about 250° C. as drying and fluidising agent. The concentrate of lysine fermentation with the above composition was sprayed in via a two-component nozzle. Under steady-state conditions, about 47 kg/h of granular product with the following product parameters were produced and discharged continuously.

Product parameters of the Biolys granular product obtained under steady-state conditions:
Moisture content: 1.3%
Bulk density: 718 kg/m3
Tapped density: 747 kg/m3
Particle size distribution:: 10% <830 $\mu$m
   50% <1090 $\mu$m
   90% <1360 $\mu$m
Attrition*: 0.14%
*Erweka Friabilator, 50 g, 20 min, 20 rpm, 45 $\mu$m screen

EXAMPLE 4

The starting material for granulation is a mixture of fermentation concentrate from the production of Biolys 60 according to the above recipe and saccharose as standardising agent. Crystalline saccharose was mixed in with the concentrate and the mixture stirred until the saccharose had completely dissolved. This concentrate has a water content of 50%, an L-lysine base content of 24%, a sugar plus saccharose content of about 2.7%, a biomass content of about 10%, the remainder being composed of other fermentation by-products and minerals.

The fluidised bed granulation-drying plant with a 400 mm distributor plate and integrated four-blade compacting device operating at a peripheral speed of 31 m/s with a power input of 490W was impinged with hot air at about 220° C. as drying and fluidising agent. The concentrate of lysine fermentation with the above composition was sprayed in via a two-component nozzle. Under steady-state conditions, about 38 kg/h of granular product with the following product parameters were produced and discharged continuously.

Product parameters of the Biolys granular product obtained under steady-state conditions:
Moisture content: 1.3%
Bulk density: 725 kg/m3
Tapped density: 749 kg/m3
Particle size distribution:: 10% <420 μm
    50% <640 μm
    90% <1000 μm
Attrition*: 0.10%
*Erweka Friabilator, 50 g, 20 min, 20 rpm, 45 μm screen

EXAMPLE 5

The starting material for granulation is a concentrated fermentation broth according to Example 2 of European patent application EP 0 615 693. The concentrate has a water content of about 53%. After granulation, the following composition was determined:

| | |
|---|---|
| L-Lysine base | 52 wt. % |
| Other a-amino acids | 3 wt. % |
| Proteins | 9 wt. % |
| Carboxylic acids with less than 8 C atoms | 7 wt. % |
| Sugar | 2 wt. % |
| Fats and oils | 3 wt. % |
| Minerals | 21 wt. % |
| Water | 1.3 wt. % |

40 kg of granular product as starting fill were placed in a fluidised bed granulation-drying plant fitted with a distributor plate with a diameter of 400 mm and a compacting device with a 5.5 kW drive integrated in the fluidised bed. The four-blade compacting device was operated at a peripheral speed of 31 m/s. The power input by the compacting device into the fluidised bed was 490W. The fluidised bed was impinged with hot air at about 220° C. as drying and fluidising agent and the concentrate of lysine fermentation with the above composition was sprayed in continuously via a two-component nozzle. Under steady-state conditions, about 35 kg/h of granular product with the following product parameters were produced and discharged continuously.

Product parameters of the Biolys granular product obtained under steady-state conditions:
Moisture content: 1.3%
Bulk density: 729 kg/m$^3$
Tapped density: 756 kg/m$^3$
Particle size distribution:: 10% <550 μm
    50% <740 μm
    90% <990 μm
Attrition*: 0.15%
*Erweka Friabilator, 50 g, 20 min, 20 rpm, 45 μm screen

What is claimed is:

1. A process for the preparation of an animal feed supplement which contains a fermentation product based on a fermentation broth, said process comprising:
    granulating, compacting and drying the fermentation broth in a fluidised bed in one step, whilst introducing into the fluidised bed by mechanical means a sufficient amount of additional energy to obtain a granular product having a predetermined particle diameter and a predetermined bulk density in addition to energy required to produce the fluidised bed.

2. A process according to claim 1, wherein the additional energy brings about an increase in the bulk density and a reduction in mean particle diameter compared with fluidised bed granulation-drying in which no additional mechanical energy is introduced.

3. A process according to claim 1 or 2, wherein
the additional energy acts in a manner of a surface treatment for compacting of the developing granule.

4. A process according to claim 1 or 2, wherein
additional energy is introduced by movable, uniplanar structures.

5. A process according to claim 4, wherein
rotating blades, blade surfaces or flat bars are used in a chamber of the fluidised bed.

6. A process according to claim 3, wherein
additional energy is introduced by movable, uniplanar structures.

7. A process according to claim 6, wherein
rotating blades, blade surfaces or flat bars are used in a chamber of the fluidised bed.

8. A process according to claim 1 or 2, wherein
mean particle size of the animal feed supplement is adjusted to values of between 0.1 and 1.5 mm.

9. A process according to claim 8, wherein
the size of the particles of the animal feed supplement is adjusted in such a way that 95% of the particles are between 0.1 and 1.5 mm.

10. A process according to claim 9, wherein
95% of the particles are between 0.3 and 1.2 mm in size.

11. A process according to claim 3, wherein
particle size of the animal feed supplement is adjusted to values of between 0.1 and 1.5 mm.

12. A process according to claim 11, wherein
the size of the particles of the animal feed supplement is adjusted in such a way that 95% of the particles are between 0.1 and 1.5 mm.

13. A process according to claim 12, wherein
95% of the particles are between 0.3 and 1.2 mm in size.

14. A process according to claim 4, wherein,
mean particle size of the animal feed supplement is adjusted to values of between 0.1 and 1.5 mm.

15. A process according to claim 14, wherein
the size of the particles of the animal feed supplement is adjusted in such a way that 95% of the particles are between 0.1 and 1.5 mm.

16. A process according to claim 15, wherein
95% of the particles are between 0.3 and 1.2 mm in size.

17. A process according to claim 5, wherein
mean particles size of the animal feed supplement is adjusted to values of between 0.1 and 1.5 mm.

18. A process according to claim 17, wherein
the size of the particles of the animal feed supplement is adjusted in such a way that 95% of the particles are between 0.1 and 1.5 mm.

19. A process according to claim 18, wherein
95% of the particles are between 0.3 and 1.2 m in size.

20. A process according to claim 1 or 2 wherein
bulk density of the animal feed supplement is adjusted to >600 kg/m$^3$.

21. A process according to claim 20, wherein
the bulk density of the animal feed supplement is adjusted to >700 kg/m$^3$.

22. A process according to claim 3, wherein
bulk density of the animal feed supplement is adjusted to >600 kg/m$^3$.

23. A process according to claim 22, wherein
the bulk density of the animal feed supplement is adjusted to >700 kg/m$^3$.

24. A process according to claim 4, wherein bulk density of the animal feed supplement is adjusted to >600 kg/m$^3$.

25. A process according to claim 24 wherein the bulk density of the animal feed supplement is adjusted to >700 kg/m$^3$.

26. A process according to claim 5, wherein bulk density of the animal feed supplement is adjusted to >600 kg/m$^3$.

27. A process according to claim 26, wherein the bulk density of the animal feed supplement is adjusted to >700 kg/m$^3$.

28. A process according to claim 1 or 2, wherein attrition resistance of the animal feed supplement is adjusted to attrition values in the region of <1.0 wt. %.

29. A process according to claim 11, wherein attrition resistance of the animal feed supplement is adjusted to attrition values of between 0 and 0.3 wt. %.

30. A process according to claim 3, wherein attrition resistance of the animal feed supplement is adjusted to attrition values of >1.0 wt. %.

31. A process according to claim 30, wherein the attrition resistance of the animal feed supplement is adjusted to attrition values of between 0 and 0.3 wt. %.

32. A process according to claim 4, wherein attrition resistance of the animal feed supplement is adjusted to attrition values of >1.0 wt. %.

33. A process according to claim 32, wherein the attrition resistance of the animal feed supplement is adjusted to attrition values of between 0 and 0.3 wt. %.

34. A process according to claim 5, wherein attrition resistance of the animal feed supplement is adjusted to attrition values of >1.0 wt. %.

35. A process according to claim 34, wherein the attrition resistance of the animal feed supplement is adjusted to attrition values of between 0 and 0.3 wt. %.

\* \* \* \* \*